United States Patent [19]
Thompson

[11] 3,979,708
[45] Sept. 7, 1976

[54] THERMOSTAT AND ANTICIPATOR THEREFOR
[75] Inventor: Paige W. Thompson, Morrison, Ill.
[73] Assignee: General Electric Company, Fort Wayne, Ind.
[22] Filed: Nov. 4, 1974
[21] Appl. No.: 520,876

[52] U.S. Cl. .............................. 337/107; 337/102; 337/377
[51] Int. Cl.² ........................................ H01H 61/02
[58] Field of Search ............ 337/99, 100, 102–104, 337/107, 377; 219/211, 209, 210, 505; 236/68 B

[56] References Cited
UNITED STATES PATENTS

| | | | |
|---|---|---|---|
| 2,732,132 | 1/1956 | Hulett | 236/68 B X |
| 3,113,439 | 12/1963 | Eargle | 236/68 B X |
| 3,794,950 | 2/1974 | Kilner | 219/505 X |

*Primary Examiner*—J D Miller
*Assistant Examiner*—Fred E. Bell
*Attorney, Agent, or Firm*—Joseph E. Papin

[57] ABSTRACT

An anticipator for controlling the cycle rate of a thermostat. The anticipator has means for transferring heat supplied thereto, and a negative temperature coefficient resistor is enclosed within the heat transferring means and disposed in heat transfer relation with it for supplying the heat thereto. The resistance of the negative temperature coefficient resistor varies as a function of its temperature wherein the negative temperature coefficient resistor is responsive to current applied thereto to attain an operating temperature appreciably in excess of that of the ambient in which the anticipator may be located for generating the heat.

A thermostat is also disclosed.

26 Claims, 8 Drawing Figures

THERMOSTAT AND ANTICIPATOR THEREFOR

RELATED APPLICATION

U.S. application Ser. No. 520,894 filed Nov. 4, 1974 is related to the present application and also assigned to General Electric Company.

BACKGROUND OF THE INVENTION

This invention relates generally to temperature control systems and in particular to a thermostat for use therein and an anticipator for a thermostat.

In the past, various apparatus, such as anticipators or the like, and various methods have been employed in various types of thermostats for controlling the cycle rate thereof with accompanying acceptable droop. Droop is a condition well known in the art occurring in all thermostats, and droop may be thought of as the difference in the average temperature controlled by the thermostat when minimum heat is required as compared with the average temperature when maximum heat is required. When an anticipator is employed with the temperature sensing means of the thermostat, droop is the difference between the basic temperature differential of the thermostat and the absolute temperature rise of the temperature sensing means of the thermostat due to anticipator heat. For instance, a good thermostat for contemporary heating systems may have generally about 5 cycles to about 7 cycles per hour with a minimum or acceptable droop of less than approximately 2°F.

In general, thermostats are optimized to function with a given set of characteristics, i.e., cycle rate and droop. These characteristics depend on the basic temperature differential of the thermostat, i.e., the difference between the "on" temperature and the "off" temperature of the temperature sensing means of the thermostat, the thermal mass of the temperature sensing means, the heating of the temperature sensing means, the heating of the temperature sensing means by an anticipator, and the cooling of the temperature sensing means. Since the temperature differential of the thermostat, the thermal mass of the temperature sensing means and the cooling thereof are fixed values for any one thermostat, it is apparent that the thermostat's characteristics are fixed except for the influence of the anticipator thereof. Therefore, the characteristics of any one thermostat will change when the heat of the anticipator is changed, i.e., an increase in heat will increase both the cycle rate and the droop. As well known in the art, when the droop condition for any one thermostat is bettered, a relatively slower cycle rate is effected. However, a slow cycle rate tends to cause large swings, i.e., large operating differentials, in room temperature. It is therefore apparent that a system for maintaining generally constant anticipator heating is desired.

In the operation of any particular thermostat, it is desirable to maintain or control a desired cycle rate for the thermostat with acceptable droop, and this has been accomplished in the past by providing various types of anticipators or auxiliary heaters in conjunction with the thermostat. In general, at least some of the past anticipators were disposed within thermostats for transmitting heat to the temperature sensing mechanism or bimetal thereof. Of course the added heat caused the thermostat to become satisfied before the temperature of the space controlled by the thermostat reached the selected or set-point temperature thereof. In this manner, satisfaction of the thermostat was anticipated to prematurely turn off the heating system for the controlled space thereby to eliminate or at least control overshoot of the temperature in the controlled space.

In at least some of the past thermostats, the switching or other power responsive elements thereof created heat which was also additive to that sensed by the temperature sensing mechanism of the thermostat thereby to affect the droop and cycle rate characteristics of the thermostat. In some instances, an attempt was made to physically separate or isolate these power responsive, heat creating elements from the temperature sensing mechanism or bimetal of the thermostat. At least one of the disadvantageous or undesirable features of this particular type of past thermostat is believed to be the impractability of effecting such separation of parts within the thermostat as well as the increased size and cost thereof which may have been engendered by such separation.

In other past thermostats, an auxiliary heater or anticipator and a regulating control therefor were incorporated to differentially provide supplemental heat additive to that of the aforementioned power responsive, heat creating elements of the thermostat. In this manner, the heat added to the temperature sensing mechanism of the thermostat was maintained at a constant value thereby to effect a selected and constant droop throughout the operating range of the thermostat. At least some of the disadvantageous or undesirable features of this particular type of past thermostat is believed to be that the anticipator and regulating control therefor was continuously on thereby to consume and waste power, and with the addition of the regulating control for the anticipator, the circuitry of the thermostat naturally became more complex, the thermostat may have increased in size, and, of course, the cost thereof undoubtedly increased.

In some other past thermostats, anticipators of the solid state type, such as thermistors for instance, were utilized in rather complicated bridge circuitry, and it may be that such complexity itself is a disadvantageous or undesirable feature not to mention the cost and maintenance which may have been involved.

Solid state elements, such as the aforementioned thermistors, have also been utilized as heaters in other circuitry and systems. One such system employed a thermistor as a heater for controlling expansion and contraction of a thermally responsive material for driving a piston or control arm for instance. However, it is apparent that such usage of thermistors is not analogous to the anticipator art for thermostats.

Some of the past anticipators utilized in thermostats were generally constituted by a wound coil with a movable arm for adding or subtracting a selected number of coil turns into the coil energizing circuit. In this manner, the amount of heat added by the anticipator to the temperature sensing mechanism of the thermostat could be regulated. However, one of the disadvantageous or undesirable features of this particular type of anticipator was that it is believed to be necessary to adjust it in the field during installation of the thermostat. Another disadvantageous or undesirable feature of such adjustable anticipators is believed to be that the field adjustment thereof may not have been correlative with the power draw of the control unit, such as a solenoid, relay or gas valve for controlling the system heat source with which the thermostat and anticipator was in circuit; also, incorrect cycle rates would be incorrect for desired confort level due to the improper amount of heat from the anticipator being transferred to the sensing element.

Further, in many of the past anticipators, heat was transferred primarily by conduction from the heat generating means thereof to the means for transferring such heat to the bimetal of the thermostat. One of the disadvantageous features of this particular type of past anticipator is believed to be that the heat generating means necessarily was operated at relatively low temperatures and was responsive to voltage variations so that the rate of heat generated was variable.

SUMMARY OF THE INVENTION

Among the several objects of the present invention may be noted the provision of a thermostat and an anticipator for controlling the cycle rate in a thermostat which overcome the disadvantageous or undesirable features discussed hereinabove, as well as others, with respect to the past thermostats and anticipators therefor; the provision of such anticipator having wattage or heat output which changes only within a generally small predetermined range irrespective of the electrical energization thereof within selected limits; the provision of such anticipator in which the rate of heat generated therein is generally constant; the provision of such anticipator wherein the heat generating means thereof is adapted for operation at temperatures appreciably in excess of the ambient temperature; the provision of such thermostat wherein the operation of a temperature selecting means thereof throughout its predetermined temperature range results only in a generally small amount of change within a selected predetermined range of heat supplied to a temperature sensing means of the thermostat by an anticipator therefor; the provision of such thermostat and such anticipator in which means for supplying or generating heat is enclosed with means for transferring the heat in a predetermined spaced relation therewith; the provision of such thermostat and such anticipator in which the heat is transferred from the heat supplying or generating means to the heat transferring means primarily by convection; the provision of such thermostat and such anticipator in which the heat supplying or generating means is mounted by means for energizing it; the provision of such thermostat and such anticipator wherein the heat supplying or generating means provides a selected amount of heat within a generally small predetermined variance range thereby to obviate adjusting mechanism or regulating controls therefor; and the provision of such thermostat and such anticipator which are simplistic is nature and design, effect economy is manufacture, and are easily assembled. Other objects and advantageous features of the invention will be in part apparent and in part pointed out hereinafter.

In general and in one form of the invention, an anticipator for controlling the cycle rate of a thermostat has means for transferring heat supplied thereto. A negative temperature coefficient resistor is enclosed within the heat transferring means for supplying the heat thereto and disposed in heat transfer relation therewith. The resistance of the negative temperature coefficient resistor varies as a function of its temperature wherein the negative temperature coefficient resistor is responsive to current applied thereto to attain an operating temperature appreciably in excess of that of the ambient in which the anticipator may be located for generating the heat.

Also in general, an anticipator in one form of the invention is operable generally for controlling the cycle rate of a thermostat. The anticipator is provided with a housing, and the housing includes a metallic member having good thermal transfer characteristics. Means on the housing is adapted for connection in conductive heat transfer relation with a temperature sensing component of the thermostat, and a generally dome-shaped portion is provided in the metallic member. An insulating member having both good electrical and thermal insulating characteristics is secured to the metallic member generally opposite to the dome-shaped portion therein, and a generally isolated chamber is formed in the housing between the metallic member and the insulating member thereof. A negative temperature coefficient resistor within the chamber extends, at least in part, into the dome-shaped portion and is disposed in heat transfer relation with the metallic member for supplying heat thereto. An electrical lead is connected with the negative temperature coefficient resistor to effect its energization for generating the supplied heat and for mounting the negative temperature coefficient resistor within the chamber generally in spaced relation with both the metallic member and the insulating member. A pair of means is provided in the insulating member for the passage of the electrical lead both into and from the chamber.

Further in general and in one form of the invention, a thermostat has means for sensing temperature of a space in which the thermostat may be located, and means operable generally as an anticipator for the thermostat is provided to attain a desired cycle rate therefor with acceptable droop. The anticipator includes means for transferring heat supplied thereto to the temperature sensing means, and a negative temperature coefficient resistor is adapted to be energized for supplying the heat to the heat transferring means. The negative temperature coefficient resistor is enclosed with the heat transferring means and disposed in heat transfer relation therewith. The temperature of the negative temperature coefficient resistor varies generally as a function of its resistance wherein the negative temperature coefficient resistor is only responsive to current applied thereto to attain an operating temperature appreciably in excess of that of the ambient in which the anticipator may be located for generating the heat.

Still further and in general, a thermostat in one form of the invention has means for sensing temperature of a space in which the thermostat may be located and also means selectively operable through a predetermined range of settings for controllably effecting a desired temperature in the space. In combination therewith, means is operable generally as an anticipator for maintaining a desired cycle rate with acceptable droop for the thermostat. The anticipator includes means coupled with the temperature sensing means for transferring heat thereto, and a negative temperature coefficient resistor is enclosed within the heat transferring means. The NTCR is adapted to be energized only in response to current applied thereto for generating the heat and supplying it to the heat transferring means at a temperature appreciably in excess of the desired temperature in the space. As a result, operation of the selectively operable means through its predetermined range of temperature settings results only a generally small amount of change in the heat supplied by the NTCR.

Also in general, a thermostat in one form of the invention has a heating circuit and a cooling circuit. Means is selectively operable for enabling one of the heating circuit and the cooling circuit, and means is movable in response to a sensed temperature for controlling the completion and the interruption, respectively, of the enabled one of the heating circuit and the cooling circuit. A negative temperature coefficient resistor is connected in the heating circuit and energized when the heating circuit is enabled for supplying heat to the controlling means to maintain a selected cycle rate thereof in the thermostat.

BRIEF DESCRIPTION OF THE DRAWINGS

Corresponding reference characters indicate corresponding parts throughout the several views of the drawings.

The exemplifications set out herein respectively illustrate the invention in one form thereof, and such exemplifications are not to be construed as limiting in any manner.

DETAILED DESCRIPTION OF THE PREFERRED EMBODIMENTS

Figure 5:
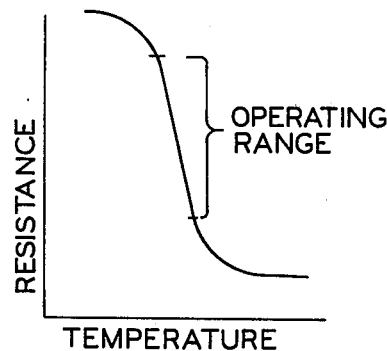
FIG. 5 is a graphical representation of a temperature-resistance curve for a typical negative temperature coefficient resistor which may be utilized as a heat source or heat generating means in the anticipator of FIG. 1.
Figure 6:
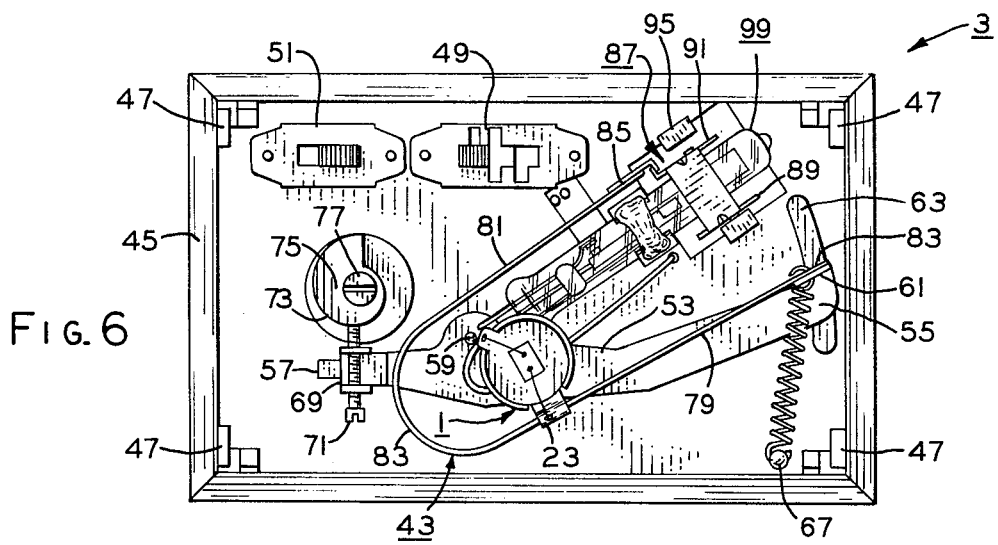
FIG. 6 is a plan view of a thermostat in one form of the invention.
Figure 7:
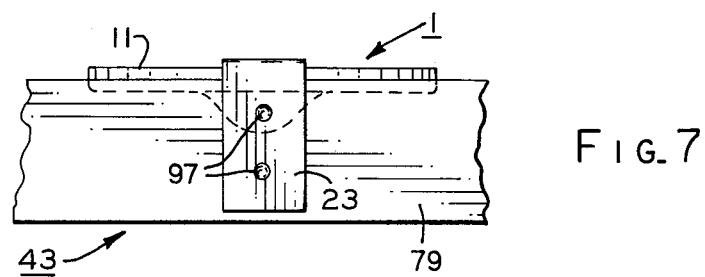
FIG. 7 is a fragmentary view illustrating the attachment of the anticipator to a bimetal strip or temperature sensing means of the thermostat of FIG. 6.
Figure 8:
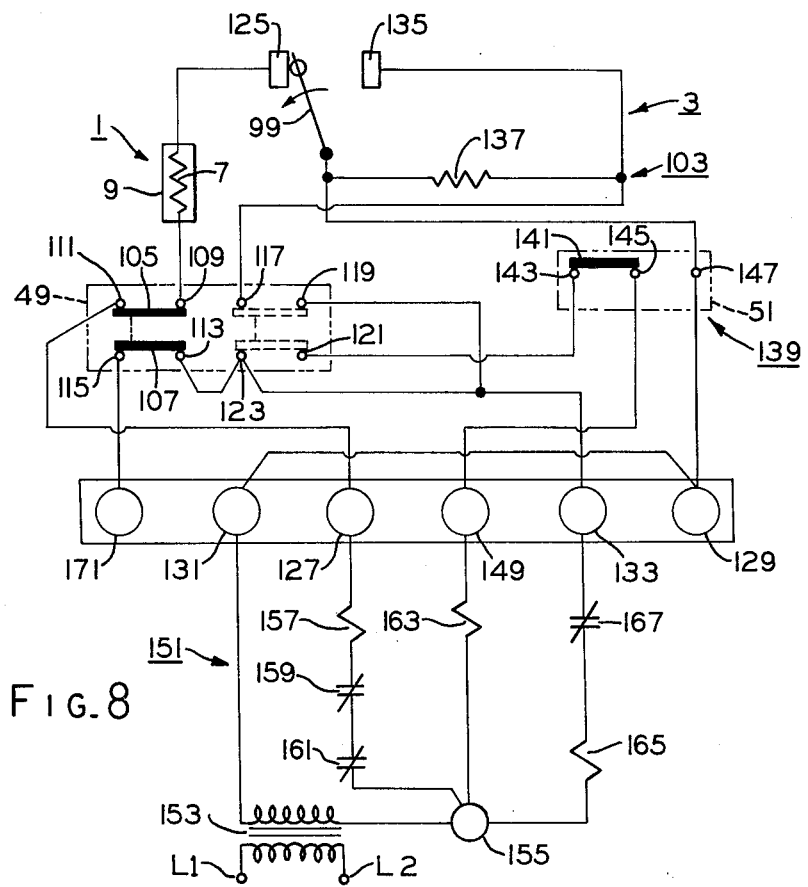
FIG. 8 is a schematic diagram of circuitry in one form of the invention for the thermostat of FIG. 6.

Referring now to the drawings in general, there is shown at 1 an anticipator (FIGS. 1–4 and 6–8) in one form of the invention for controlling the cycle rate of a thermostat 3 (FIGS. 6–8). Anticipator 1 has means, as indicated generally at 5, for transferring heat supplied thereto (FIGS. 1–4), and a negative temperature coefficient resistor 7 (hereinafter referred to as an NTCR) is enclosed within the heat transferring means in heat transfer relation therewith for supplying the heat (FIGS. 2–4). The resistance of NTCR 7 varies generally as a function of its temperature (FIG. 5), and the NTCR is responsive to current applied thereto to attain an operating temperature appreciably in excess of that of the ambient in which anticipator 1 may be located for generating the heat.

Figure 1:
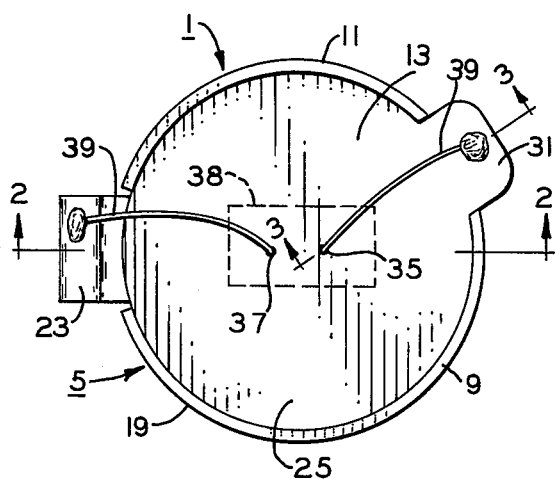
FIG. 1 is a plan view of an anticipator in one form of the invention.
Figure 2:
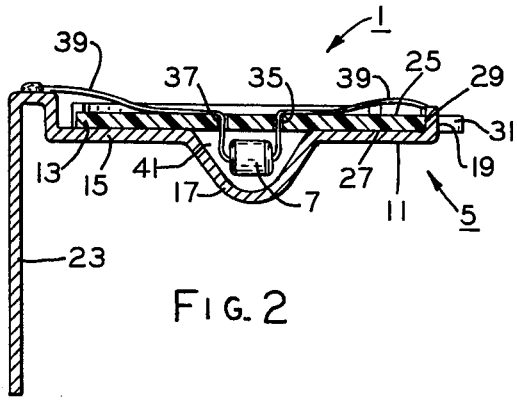
FIGS. 2 and 3 are sectional views taken along line 2—2 and line 3—3, respectively, of FIG. 1.
Figure 3:
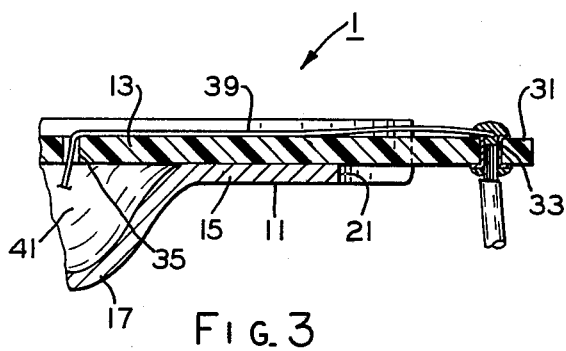
Figure 4:
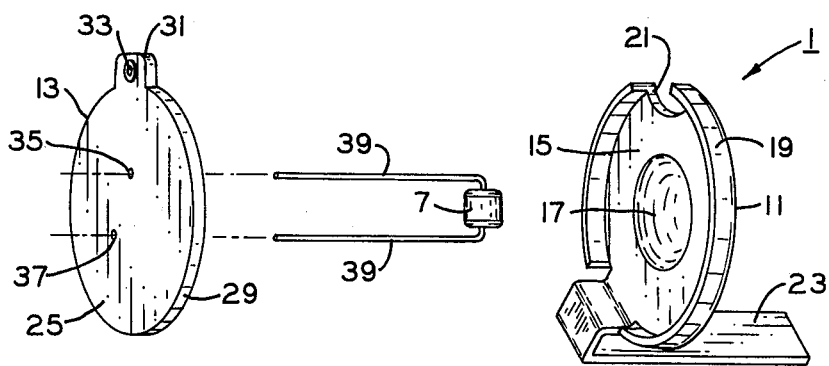
FIG. 4 is an exploded perspective view of the anticipator of FIG. 1.

More particularly and with specific reference to FIGS. 1–3, heat transferring means 5 of anticipator 1 includes a housing 9 having a metallic member or portion 11 with good thermal transfer characteristics or properties and an insulating member or portion 13 with good electrical and thermal or heat insulating characteristics or properties. While metallic member 11 is shown as being recessed or generally cup-shaped and insulating member 13 as being generally disc-shaped purposes of disclosure, it is contemplated that both the metallic member and the insulating member may be provided with other shapes or forms within the scope of the invention.

Metallic member 11 is provided with a base wall 15 having a generally dome-shaped portion or recess 17 integrally extending from the base wall generally centrally thereof, and an upstanding, generally annular side wall 19 is integrally formed with the base wall adjacent the periphery thereof. Side wall 19 extends generally axially from base wall 15 in a direction generally opposite to the extension of dome-shaped portion 17 therefrom. An aperture or slot 21 is provided through both base wall 15 and side wall 19. Means, such as a tab, strap or other similar extension 23, is integrally formed with side wall 19 of metallic member 11 having at least a portion lanced therefrom, and the tab extends from the side wall for connection in conductive heat transfer relation with a component of thermostat 3, as discussed hereinafter. While tab 23 is shown for purposes of disclosure as integrally formed with metallic member 11, it is contemplated that the tab could be separately formed and connected to the metallic member by suitable means well known to the art within the scope of the invention.

As previously mentioned, insulating member 13 is generally disc-shaped having opposite and relatively flat faces 25, 27 intersecting with or bounded by a generally annular or peripheral margin or edge 29. When metallic member 11 and insulating member 13 are mounted or assembled together, as described in greater detail hereinafter, interior face 27 of the insulating member may be seated on or at least disposed in close proximity with base wall 15 of the metallic member, and peripheral edge 29 of the insulating member may be press-fitted, interference-fitted, crimped, staked, or otherwise connected by means well known in the art in displacement preventing engagement with side wall 19 of the metallic member. A hub or node 31 having an opening 33 therethrough for electrical lead location purposes, as discussed hereinafter, is integrally formed on insulating member 13 extending generally radially from peripheral edge 29 thereof and projecting through aperture 21 in metallic member 11. Means, such as a pair of apertures or passages 35, 37, for the passage therethrough of a pair of electrical leads 39, as discussed hereinafter, is generally centrally provided in insulating member 13 intersecting with opposite faces 25, 27 thereof. A generally isolated chamber 41 is defined interiorly of dome-shaped portion 17 between metallic member 11 and insulating member 13 upon the assembly thereof, and passages 35, 37 in the insulating member are disposed so as to communicate with the chamber. It may be noted that dome-shaped portion 17 is provided generally to gather and contain the heat generated by NTCR 7 upon the energization thereof so that a maximum amount of such generated heat may be transferred primarily by convection from the NTCR to metallic member 11 while maintaining heat losses to the ambient at a minimum. While dome-shaped portion 17 is shown for purposes of disclosure, it is contemplated that portions having other shapes may be provided in metallic member 11 thereby to form chamber 41 within the scope of the invention.

NTCR 7 is a solid state component formed from various materials well known to the art and having a characteristic, when energized, of decreasing its resistance only in response to current applied thereto and generally as a function of temperature. A graphical representation of this characteristic for a typical NTCR is illustrated in FIG. 5, and the curve thereof is shown only to illustrate the functional relationship between the temperature and the resistance of a NTCR in response to applied voltage. It is, of course, well known in the art that each different NTCR will exhibit its own particular resistance-temperature curve. Electrical leads 39 are both electrically and structurally attached to NTCR 7 by suitable means well known to the art, such as electrical conducting cement or the like (not shown), and the NTCR is disposed within chamber 41 in predetermined spaced relation with respect to both metallic member 11 and insulating member 13. Of course, electrical leads 39 pass through passages 35, 37 in insulating member 13 and may be disposed on or adjacent exterior face 25 thereof for circuit connections, as discussed hereinafter. It may be noted that electrical leads 39 are not only the sole structural support for mounting NTCR 7 within chamber 41 but also constitute means for effecting energization of the NTCR. Further, it may also be noted that electrical leads 39 generally constitute means for disposing NTCR 7 in predetermined spaced relation with metallic member 11 and insulating member 13.

NTCR 7 is both electrically and structurally connected with electrical leads 39 by suitable means well known to the art, such as electrically conducting cement for instance, as previously mentioned. While this connection of NTCR 7 and leads 39 is illustrated for purposes of disclosure, it is contemplated that such connection may be made by other means or in other manners well known in the art or that the NTCR material may be formed or otherwise built-up about an electrical lead within the scope of the invention. With NTCR 7 so mounted or connected to leads 39, the leads are then inserted, either individually or conjointly, through passages 35, 37 in insulating member 13 so that the NTCR is disposed in predetermined spaced relation with interior face 27 of the insulating member. Although NTCR 7 is spaced from insulating member 13 in the preferred exemplification of the invention, it is contemplated that NTCR may engage the insulating member within the scope of the invention; however, it is believed that such engagement would deleteriously affect the wattage output or heat generating effect of the NTCR upon energization thereof. Electrical leads 39 may be laid over into abutment with exterior face 25 of the insulating member, and means, such as a piece of electrical insulating tape or other suitable or desirable adhesive material, as shown in dotted outline at 38 in FIG. 1, may be applied to the electrical leads and the exterior face of the insulating member for mounting them in their assembled relation. In this manner, electrical leads 39 are maintained against displacement from insulating member 13 not only to position the leads for subsequent circuit connection but also to maintain NTCR 7 disposed in its predetermined spaced relation relative to interior face 27 of the insulating member. Insulating member 13 with NTCR 7 and electrical leads 39 mounted thereto is then attached or assembled to metallic member 11. To effect such attachment, insulating member 13 is disposed with its node 31 adjacent aperture 21 for receiving it in metallic member 11, and at least one of the insulating member and the metallic member is moved relative to the other thereof thereby to position or assemble peripheral edge 29 of the insulating member within side wall 19 of the metallic member. Upon the assembly of metallic member 11 and insulating member 13 into engagement with each other, at least a part of portion of NTCR 7 is disposed or suspended within chamber 41 and interior face 27 of the insulating member engages base wall 15 of the metallic member. The engagement of interior face 27 with base wall 15 serves not only to limit the relative movement of metallic member 11 and insulating member 13 upon the assembly thereof but also serves to establish or define the predetermined spaced relationship between the metallic member and NTCR 7. In the preferred exemplification of anticipator 1, as previously mentioned, peripheral edge 29 of insulating member 13 is press-fitted, or interference-fitted into displacement preventing engagement with side wall 19 of metallic member 11. However, if desired, side wall 19 may be subsequently crimped, staked or otherwise urged in a manner well known to the art into the displacement preventing engagement with peripheral edge 29 of insulating member 13 within the scope of the invention. Of course, such engagement between peripheral edge 29 and side wall 19 not only prevents relative displacement of metallic member 11 and insulating member 13 but also serves to generally centrally locate NTCR 7 within chamber 41 thereby to also assist in the establishment or maintenance of the predetermined spaced relation between the NTCR and the metallic member. It is desirable to maintain NTCR 7 predeterminately spaced from metallic member 11 so that the heat may be contained within housing 9 of anticipator 1 with minimum loss to the ambient and so that the heat may be transferred primarily by convection from the NTCR to metallic member 11 of the anticipator. Any touching or engagement between NTCR 7 and metallic member 11 would create a heat sink causing a heat run-away by the NTCR upon energization thereof.

It is preferred to operate NTCR 7 of anticipator 1 at temperature values appreciably in excess of the ambient temperature. This is desirable since a greater differential between the operating temperature of NTCR 7 and the ambient results in the heat output or wattage of anticipator 1 becoming percentage-wise more constant. To illustrate, it may be noted that NTCR 7, when energized, is operable generally at the higher temperature values shown therefor in the graphical representation of the resistance-temperature curve of FIG. 5. When energized, NTCR 7 very rapidly attains its operating temperature which is appreciably in excess of the ambient in which anticipator 1 may be located. If the operating or surface temperature of the NTCR is about 180°F and the ambient temperature in the comfort range of between about 55°F and about 80°F, then the differential between the NTCR operating temperature and the extreme values of the ambient comfort range temperature is, of course, respectively about 100°F and 125°F. This means that there is only about a 25 percent change in wattage of anticipator 1 between the temperature settings or set-points of 55°F through 80°F of thermostat 3. Of course, if NTCR materials are utilized which can attain a higher operating or surface temperature, then the differential between such higher operating temperature and the ambient temperature would be increased resulting in a correspondingly decreased percent change in wattage between the set-point temperature of 55°F through 80°F of thermostat 3. Such a small percentage of total output wattage or heat over the predetermined range of set-point temperatures, i.e., from 55°F to 80°F, in which thermostat 3 may be designed to operate would be, for the most part undecernable; therefore, for all practical purposes, anticipator 1 may be thought of as being a generally constant heat generating device. In this vein, since NTCR 7 is normally operated at the higher values of temperature and resistance, as previously mentioned and as illustrated in the graphical representation of FIG. 5, it may be noted that the output wattage or heat of the NTCR is virtually unaffected by changes in current applied thereto upon energization of the NTCR. In other words, the slope of the temperature-resistance curve shown in FIG. 5 is so steep that NTCR 7 may be brought up to its operating temperature with a very small current input, for example in a thermostat designed to operate in a current range generally between a value slightly in excess of 0 amperes and about 2 amperes. Therefore, it may be noted that amperage change within the thermostat range between a current value slightly in excess of 0 amperes to generally about 2 amperes has such little affect on the rate of the wattage output of NTCR 7 that such rate may, for all practical purposes, be thought of as being generally constant.

As well known in the art, thermostats may have a chimney effect wherein ambient air in the space that the thermostat may be located is drawn through the thermostat thereby to establish convective currents or air flow over the thermostat anticipator. Such chimney effect acted to dissipate or carry away heat from the anticipator; however, it may be noted that encasing NTCR 7 within housing 9 of anticipator 1 generally isolates the NTCR from the convective air flows of the chimney effect. In this manner, encasement of housing 9 of anticipator 1 serves to trap or preserve the output watts or heat of NTCR 7 so that heat may be transferred generally at a maximum rate from NTCR 7 to metallic number 11 of housing 9 in anticipator 1 with a minimum of heat loss due to the chimney effect of the particular thermostat in which the anticipator may be located. It is believed that, for the most part, the heat generated by NTCR 7 is conveyed by convection to metallic member 11 due to the encasement of NTCR 7 in anticipator housing 9 in the aforementioned predetermined spaced relation therewith.

With reference again in general to the drawings, thermostat 3 (FIG. 6) in one form of the invention has means, such as a bimetal strip 43, for sensing temperature of a space in which the thermostat may be located. Means for operation as an anticipator, such as anticipator 1 (FIGS. 1–4 and 6–8) is provided in thermostat 3 to attain a desired cycle rate for the thermostat. Anticipator 1 includes means, such as housing 9, for transferring heat supplied thereto to temperature sensing means or bimetal strip 43, and NTCR 7, which is adapted to be energized for supplying the heat to the heat transferring means or housing 9, is enclosed within the housing in heat transfer relation therewith.

More particularly and with specific reference to FIG. 6, thermostat 3 is provided with a base 45 on which various operating components of the thermostat are mounted, and post structures 47 are provided adjacent the corners of the base for removably mounting a cover (not shown) for the thermostat which has been omitted for the sake of drawing simplicity. A pair of switches 49, 51 are mounted to the base for selectively enabling the operating modes of the thermostat and for controlling operation of a system fan (not shown), as is well known in the art. Thermostat 3 is generally of the type shown and described in U.S. Pat. No. 3,573,698 issued Apr. 6, 1971 to Stanley R. Mitick, and reference may be had to this patent for a more detailed discussion of the operating components of the thermostat if desired.

An elongate pivot arm 53 having generally opposite free or distal ends 55, 57 is pivotally mounted on base 45 to a pivot pin, such as a rivet 59 or the like, retained in the base. One of the distal ends 55 is provided with an integral retainer or upwardly bent tab 61, and the one distal end is slidably and guidably engaged with a generally arcuate ridge 63 on base 45. Means, such as a spring 65, is biased between retainer 61 of distal end 55 and a post 57 provided on base 45 for pivotally or resiliently urging pivot arm 53 in clockwise direction (as seen in FIG. 6) about pivot pin 59. On the other opposite distal end 57 of pivot arm 53, there is fixed by suitable means well known to the art (not shown) a generally U-shaped bracket 69 in which an adjusting or operating screw 71 is threadedly or adjustably received. The resilient force of spring 65 acting on pivot arm 53 is effective to pivotally urge an end of the adjusting screw toward abutting or following engagement with a camming surface 73 of a cam 75. Cam 75 is integral with a shaft 77 which is rotatably retained in base 45 by suitable means well known in the art (not shown), and a manually operated knob (not shown), which is omitted for drawing simplicity, may be attached to the shaft for conjointly rotating it and the cam through a predetermined arc or a plurality of temperature settings or set-points constituting a predetermined range of temperature in which thermostat 3 is operable. When cam 75 is rotated, camming surface 73 thereof drives against adjusting screw 71 so as to pivot or rotate pivot arm 53 about pivot pin 59 causing distal end 61 to move on arcuate surface 63, and of course, the resilient force of spring 67 either assists or opposes the pivotal movement of the pivot arm depending upon the direction in which the cam is rotated.

Bimetal strip 43 has a pair of laterally spaced, generally parallel and coextensive legs 79, 81 which are interconnected by a portion 83 integrally formed therebetween and having a generally U-shaped configuration. Legs 79, 81 of bimetal strip 43 are provided with distal end portions 83, 85, and end portion 83 is fixedly connected by suitable means well known to the art, such as spot welding or rivets or the like (not shown), to retainer 61 of pivot arm 53 while a bifurcated yoke or armature 87 is carried on end portion 85 of leg 81. Armature 87 is also fixedly connected by suitable means well known to the art, such as spot welding or riveting or the like (not shown), to leg end portion 85, and a pair of spaced apart, generally parallel depending fingers or abutments 89, 91 are integrally provided on the armature for abutting or motion limiting engagement with a pair of space stops 93, 95 which extend generally upwardly from base 45.

As previously mentioned, bimetal legs 79, 81 are generally parallel although they may either slightly converge or diverge depending upon the desired prestressing thereof and the temperature of bimetal strip 43. When cam 75 is rotated to effect the selection of a desired set-point temperature throughout the predetermined temperature range of thermostat 3, distal end 55 of pivot arm 53 is pivoted in the clockwise direction, as discussed hereinabove, and retainer 61 on the pivot arm carries bimetal strip 43 generally as a unit conjointly with the distal end 55 until finger 89 of armature 87 engages stop 93. Further clockwise movement of pivot arm 53 will effect divergence of bimetal legs 79, 81 as retainer 61 of the pivot arm continues to drive bimetal leg 79 in the clockwise direction while the engagement of armature finger 89 with stop 93 prevents further conjoint movement of the armature 87 end of bimetal leg 81. Of course, this driven movement of bimetal strip 43 stresses it, and such stress may be overcome by a temperature change in the bimetal strip in order to effect return movement of its leg 81 relative to leg 79 to re-engage finger 91 of armature 87 with its stop 95.

In a similar manner, counterclockwise movement of pivot arm 53 (as seen in FIG. 6) will move bimetal strip 43 generally as a unit until armature finger 91 becomes engaged with its cooperating stop 95. Thereafter, additional counterclockwise movement of retainer 61 and bimetal leg 79 causes convergence thereof with respect to bimetal leg 81 as armature 87 end of bimetal leg 81 is restrained by engagement with its stop 95 from further counterclockwise movement. This driven movement of bimetal strip 43 also stresses it, and as previously mentioned, such stresses may be overcome by a temperature change in the bimetal strip in order to effect return movement of its leg 79 relative to leg 81 to re-engage finger 89 with its cooperating stop 93. It may be noted that stops 93, 95 generally define predetermined opposite or extreme positions for fingers 89, 91 of armature 87 enabling bimetal strip 43 to be prestressed so as to effect selective altering or changing of the selected or control temperature setting or setpoints of thermostat 3. Adjusting screw 71 serves as means for adjustably setting or precalibrating thermostat 3 so that it does in fact operate at the set-point selected therefor. Thus, cam 73 is selectively operable to adjustably set the control temperature or set-point temperature for bimetal strip 19, and the cam and its cooperating components generally constitute means selectively operable through a predetermined range of settings for controllably effecting a desired temperature in a space in which thermostat 3 may be located.

As previously mentioned, if a thermostat would be allowed to respond only to temperature of a space in which the thermostat was located, there would be overshoot in both the temperature increasing and decreasing direction with respect to the set-point temperature selected for the thermostat. In other words, if the thermostat was operable, i.e. set or adjusted, to turn off the heating system when the temperature in the space or room reached 70°F, by way of example, the temperature in the space may actually rise somewhat above 70°F. Of course, when the heating system is off, the temperature in the space may actually fall somewhat below 70°F before the thermostat functions to actuate the heating system. This variance of temperatures with respect to the set-point temperature at which a thermostat is actually operable is generally referred to as operating differential or room temperature swing. In order to maintain a low operating differential within an acceptable or generally small range, anticipator 1 is provided to control cycle rate by preheating bimetal strip 43. Thus, bimetal strip 43 will attain the set-point temperature before the temperature in the space attains the value of the set-point temperature so as to limit the overshooting effect and maintain the room temperature differential within acceptable limits.

In order to control or maintain a selected or desired cycle rate of thermostat 3 with acceptable droop, anticipator 1 is provided to transfer heat generated by NTCR 7 upon energization thereof to bimetal strip 43, i.e. to preheat it. Tab 23 of metallic member 11, described hereinabove with respect to anticipator 1, is disposed generally across the width of bimetal leg 79 in direct engagement or conductive heat transfer association therewith, and the tab is fixedly connected by suitable means, such as a plurality of spot welds 97 or the like for instance, to the bimetal leg, as shown in FIG. 7. In this manner, tab 23 is not only effective to transmit by conduction to bimetal leg 79 the heat generated by anticipator 1 but also serves to mount the anticipator to bimetal strip 43.

Anticipator 1 should be attached to bimetal strip 43 at a point where a minimum amount of watts is required to provide the desired cycle rate of thermostat 3. Heat for anticipation, of course, results in thermostat droop. Therefore, the minimum amount of droop will be attained using the lowest possible watts of anticipator heat.

NTCR 7 of anticipator 1 is controlled, i.e. selectively energized and de-energized, by a magnetically operated switch, indicated generally at 99, which is connected in circuit relation with the NTCR, as discussed in greater detail hereinafter. Switch 99 is operable generally in response to movement of armature 87 between its extreme or opposite positions upon the thermal actuation of bimetal strip 43, as discussed hereinabove, to respectively complete and interrupt the application of current to NTCR 7 for respectively energizing and de-energizing it.

From the foregoing and referring again to the drawings in general, it may be seen that thermostat 3 in one form of the invention has means, such as bimetal strip 43, for sensing temperature of a space in which the thermostat may be located and also means, such as cam 25, selectively operable through a predetermined range of settings for controllably effecting a desired temperature in the space (FIG. 6). Means, such as anticipator 1, is operable generally for maintaining a desired cycle rate with acceptable droop for thermostat 3 and includes means, such as anticipator housing 9 and its tab 23, coupled with bimetal strip 43 for transferring heat thereto. NTCR 7 is enclosed within heat transferring means or housing 9 and adapted to be energized for generating the heat and supplying it to the housing at a temperature appreciably in excess of the desired temperature in the space wherein operation of the selectively operable means or cam 23 through its predetermined range of temperature settings results only in a generally small amount of change in the heat supplied by the NTCR (FIGS. 1-4, 6 and 7).

Referring now to FIG. 8, thermostat 3 in one form of the invention is provided with a heating circuit 101 and a cooling circuit 103, and means, such as switch 49, is selectively operable for enabling one of the heating circuit and the cooling circuit. Means, such as bimetal strip 43, is movable in response to a sensed temperature for controlling the completion and the interruption, respectively, of the enabled one of the heating circuit 101 and the cooling circuit 103. Further, NTCR 7, is connected in heating circuit 101 and energized upon the enabling thereof for supplying heat to controlling means or bimetal strip 43 to maintain a selected cycle rate thereof in thermostat 3.

More particularly, switch 49 is manually operable to its heating mode enabling heating circuit 101 when its pair of mechanically linked contact bars 105, 107 make with contacts 109, 111 and 113, 115, respectively.

Contacts 117, 119 and 121, 123 of switch 49 are provided in cooling circuit 101 for enabling thereof when contact bars 105, 107 are respectively made with these contacts. As may be recalled, magnetically operable switch 99 is actuated between energizing and deenergizing positions by fingers 89, 91 of armature 87 on bimetal strip 43 in response to movement of the armature between its extreme or opposite positions. In its energizing position as shown in FIG. 8, magnetically operated switch 99 is engaged with a heating contact 125 thereof in heating circuit 101 thereby to complete the heating circuit when it is enabled by switch 49. Upon such completion of heating circuit 101 power may flow from a thermostat terminal 127 through contact bar 105 and contacts 109, 111 to heating contact 125 of magnetically operated switch 99. Therefrom, power flows through switch 99 when engaged with its heating contact 125 to a pair of thermostat terminals 129, 131 which are interconnected. It may be noted that NTCR 7 of anticipator 1 is connected between contact 109 of switch 49 and heating contact 125 of magnetic switch 99 and when the heating circuit is enabled by switch 49, the NTCR is energized.

When contact bars 105, 107 of switch 49 are manually moved into making engagement with contacts 117, 119 and 121, 123, respectively, as illustrated by the dotted lines in FIG. 8, of cooling circuit 103, it is enabled, and heating circuit 101 is opened or disabled. Of course, the set-point temperature of thermostat 3 selected by operator operation of cam 75 thereof, as described hereinbefore, will cause bimetal strip 43 to move its armature 87 so as to drive magnetically operated switch 99 toward making engagement with a cooling contact 135 thereof. With magnetically operated switch 99 made with its cooling contact and switch 49 enabling cooling circuit 103, power may flow from thermostat terminal 133 through contact bar 105 made between contacts 117, 119. Therefrom, the power flows to cooling contact 135 and through magnetically operated switch 99 made therewith to interconnected thermostat terminals 129, 131. Another anticipator 137 may be connected in cooling circuit 103 across magnetically operated switch 99 and its cooling contact for energization upon completion of the cooling circuit to effect preheating of bimetal strip 43 much in the same manner of the preheating thereof by anticipator 1, as previously described, if desired.

If desired, thermostat 3 may also include a fan operating circuit, indicated generally at 139. Switch 51 is included in fan operating circuit 139 having a contact bar 141 manually movable between making engagement with switch contacts 143, 145 in an automatic operating mode and between switch contacts 145, 147 in an on operating mode. When switch 49 is set to enable power circuit 103, as previously described, and contact bar 141 made with contacts 143, 145 of switch 51 to effect the automatic operating mode thereof, power may flow from thermostat terminal 133 through contact bar 107 and contacts 121, 123 of switch 49 and therefrom through contact bar 141 and contacts 143, 145 of fan switch 51 to another thermostat terminal 149. When contact bar 141 of fan switch 51 is manually moved to make with contacts 145, 147, the on operating mode of switch 51 is effected. Power may then flow from thermostat interconnected terminals 129, 131 through contact bar 141 and contacts 145, 147 of fan switch 51 to thermostat terminal 149. Of course, other components in a heating and cooling system 151, briefly discussed below, which is adapted to be controlled by thermostat 3 are operable to effect the power flow when fan switch 51 is in its automatic operating mode.

As shown generally in FIG. 8, a transformer 153 has its primary side connected across power terminals L1, L2, and the secondary side of the transformer is connected in series circuit relation between thermostat terminal 131 and a common terminal 155. A gas valve or heating relay 157 is connected in series circuit relation with a safety pilot or temperature limit switch 159 and a high temperature limit switch 161 between thermostat terminal 127 and common terminal 155. A fan operating relay 163 is connected in series circuit relation between thermostat terminal 149 and common terminal 155. To complete the description of heating and cooling system 151, a compressor motor contactor 165 is connected in series circuit relation with a high pressure cut-out 167 on a compressor (not shown) for the heating and cooling system between thermostat terminal 133 and common terminal 155. The heating and cooling system 151 set out herein is not a part of this invention and is so well known in the art that a description of its operation is believed to be superfluous and therefore is omitted for the sake of brevity.

In view of the foregoing, it is now apparent that a novel anticipator 1 and a novel thermostat 3 are provided meeting the objects and advantageous features set out hereinbefore, as well as others. It is contemplated that changes in the precise configurations, shapes and details of the structures which are presented merely to illustrate the invention may be made by those skilled in the art without departing from the spirit of the invention and the scope thereof as set out by the claims which follow.

What I claim as new and desire to secure by Letters Patent of the United States is:

1. In an anticipator for controlling the cycle rate of a thermostat and having means for transferring heat supplied thereto; the combination therewith comprising an NTCR enclosed within the heat transferring means in heat transfer relation therewith and operable generally for supplying the heat to the heat transferring means, the resistance of the NTCR varying as a function of its temperature wherein the NTCR is adapted to be responsive to current applied thereto to attain an operating temperature appreciably in excess of that of the ambient in which the anticipator may be located.

2. In an anticipator as set forth in claim 1, further comprising means associated with the heat transferring means for mounting the NTCR within the heat transferring means so as to be generally spaced from engagement therewith.

3. In an anticipator as set forth in claim 2, wherein the mounting means comprises means adapted for applying the current to the NTCR and generally constituting its sole support within the heat transferring means.

4. In an anticipator as set forth in claim 3, wherein the current applying means includes means for supporting engagement with the heat transferring means.

5. In an anticipator as set forth in claim 2, wherein the mounting means comprises a pair of electrical leads having a portion interiorly of the heat transferring means disposed in supporting engagement with the NTCR and having at least another portion exteriorly of the heat transferring means in mounting engagement therewith, respectively.

6. In an anticipator for controlling the cycle rate of a thermostat and having means for transferring heat supplied thereto, the heat transferring means including a generally isolated chamber therein; the combination therewith comprising an NTCR disposed at least in part within the chamber in heat transfer relation with the heat transferring means for supplying the heat thereto, the resistance of the NTCR varying as a function of its temperature wherein the NTCR it adapted to be responsive to current applied thereto to attain an operating temperature appreciably in excess of that of the ambient in which the anticipator may be located for generating the heat.

7. In an anticipator for controlling the cycle rate of a thermostat and having means for transferring heat supplied thereto; the combination therewith comprising an NTCR for supplying the heat to the heat transferring means and disposed in heat transfer relation therewith, the resistance of the NTCR varying as a function of its temperature wherein the NTCR is adapted to be responsive to current applied thereto to attain an operating temperature appreciably in excess of that of the ambient in which the anticipator may be located for generating the heat, and wherein the heat transferring means includes a housing generally enclosing the NTCR with at least a portion of the housing being constituted by a metal having good heat transfer characteristics.

8. In an anticipator as set forth in claim 7, wherein the metal portion of the housing includes a recessed part into which at least a part of the NTCR extends.

9. In an anticipator as set forth in claim 7, wherein the housing includes means for connection with the metal portion and having good electrical and heat insulating characteristics.

10. In an anticipator as set forth in claim 9, further comprising means extending through the connection means for mounting the NTCR within the housing in spaced relation with both the metal portion and the connecting means.

11. An anticipator as set forth in claim 10, wherein the mounting means is generally constituted by means for applying the current to the heat supplying means.

12. In an anticipator for controlling the cycle rate of a thermostat and having means for transferring heat supplied thereto; the combination therewith comprising an NTCR for supplying the heat and enclosed within the heat transferring means so as to be generally isolated by it from the ambient thereby to permit transfer of the heat from the NTCR to the heat transferring means generally at a constant rate, the resistance of the NTCR varying as a function of its temperature wherein the NTCR is adapted to be responsive to current applied thereto to attain an operating temperature appreciably in excess of that of the ambient in which the anticipator may be located.

13. In an anticipator operable generally for controlling the cycle rate of a thermostat having a housing, the housing including a metallic member having good thermal transfer characteristics, means on the housing adapted for connection in conductive heat transfer relation with a temperature sensing component of the thermostat, a generally recessed portion in the metallic member, an insulating member having both good electrical and thermal insulating characteristics and secured to the metallic member generally opposite to the recessed portion therein, a generally isolated chamber in the housing between the metallic member and the insulating member thereof, a pair of passages in the insulating member communicating with the chamber; the combination therewith comprising an NTCR within the chamber extending at least in part into the recessed portion and disposed primarily in convective heat transfer relation with the metallic member for supplying heat thereto, and a pair of electrical leads adapted to apply current to the NTCR to effect energization thereof for generating the supplied heat and extending through the passages for mounting the NTCR within the chamber generally in spaced relation with both the metallic member and the insulating member.

14. In a thermostat having means for sensing temperature of a space in which the thermostat may be located; the combination therewith comprising means operable generally as an anticipator for the thermostat to attain a desired cycle rate with acceptable droop therefor including means for transferring heat supplied thereto to the temperature sensing means, and an NTCR adapted to be energized for supplying the heat to the heat transferring means and enclosed within the heat transferring means in heat transfer relation therewith, the temperature of the NTCR varying generally as a function of its resistance wherein the NTCR is only responsive to current applied thereto to attain an operating temperature appreciably in excess of that of the ambient in which the anticipator may be located for generating the heat.

15. In a thermostat as set forth in claim 14, wherein the heat transferring means includes means for coupling the heat transferring means in thermal conductive relation with the temperature sensing means.

16. In a thermostat as set forth in claim 14, wherein the heat transferring means includes a generally isolated chamber, and the NTCR being disposed within the isolated chamber in spaced relation with the heat transferring means.

17. In a thermostat as set forth in claim 16, including means extending into the chamber for effecting the energization of the NTCR and for mounting it within the chamber in the spaced relation with the heat transferring means.

18. In a thermostat as set forth in claim 14, wherein the heat transferring means includes a housing generally enclosing the heat supplying means, and at least a portion of the housing being constituted by a metal having good heat transfer characteristics.

19. In a thermostat as set forth in claim 18, wherein the metal portion includes means for coupling the heat transferring means in heat conductive relation to the temperature sensing means.

20. In a thermostat as set forth in claim 18, wherein the housing further includes means for engagement with the metal portion to enclose the NTCR and having both good electrical and heat insulating characteristics.

21. In a thermostat as set forth in claim 20, including means extending through the engagement means for mounting the NTCR within the housing in predetermined spaced relation with both the metal portion and the engagement means.

22. In a thermostat as set forth in claim 21, wherein the mounting means is generally constituted by means for applying the current to the NTCR for effecting the energization thereof.

23. In a thermostat as set forth in claim 14, wherein the temperature sensing means is a bimetal strip, the heat transferring means being coupled with the bimetal strip in conductive heat transfer relation at a predetermined location thereon to attain a selected cycling rate of the thermostat.

24. In a thermostat as set forth in claim 14, wherein the enclosure of the NTCR by the heat transferring means generally isolates the NTCR from the ambient of the space in which the thermostat may be located thereby to enhance the transfer of the heat from the NTCR to the heat transferring means generally at a constant rate.

25. In a thermostat having means for sensing temperature of a space in which the thermostat may be located, and means selectively operable through a predetermined range of settings for controllably effecting a desired temperature in the space; the combination therewith comprising means operable generally as an anticipator for maintaining a desired cycle rate with acceptable droop for the thermostat and including means conductively coupled with the temperature sensing means for transferring heat thereto, and an NTCR enclosed within the heat transferring means and adapted to be energized only in response to current applied thereto for generating the heat and supplying it to the heat transferring means at a temperature appreciably in excess of the desired temperature in the space wherein operation of the selectively operable means through its predetermined range of temperature settings results only a generally small amount of change in the heat supplied by the NTCR.

26. In a thermostat having means for sensing temperature of a space in which the thermostat may be located; the combination therewith comprising an anticipator for the thermostat including means for transferring heat supplied thereto and coupled in heat transfer relation to the temperature sensing means, a generally isolated chamber within the heat transferring means, and an NTCR disposed in the chamber in heat transfer relation with the heat transferring means and operable generally when energized for supplying the heat thereto.

* * * * *